Dec. 9, 1924.

H. HECHT ET AL

MACHINE FOR TESTING MATERIALS

Filed Oct. 30, 1923

1,518,790

Inventors
Heinrich Hecht and Wilhelm Rudolph
by Knight Bros
Attorneys

Patented Dec. 9, 1924.

1,518,790

UNITED STATES PATENT OFFICE.

HEINRICH HECHT AND WILHELM RUDOLPH, OF KIEL, GERMANY, ASSIGNORS TO SIGNAL GESELLSCHAFT MIT BESCHRÄNKTER HAFTUNG, OF KIEL, GERMANY, A FIRM.

MACHINE FOR TESTING MATERIALS.

Application filed October 30, 1923. Serial No. 671,815.

*To all whom it may concern:*

Be it known that we, HEINRICH HECHT and WILHELM RUDOLPH, citizens of the German Republic, and residing at Kiel, Province of Schleswig-Holstein, and State of Prussia, Germany, have invented certain new and useful Improvements in Machines for Testing Materials, of which the following is a specification.

It has already been proposed to carry out the testing of certain materials such as metals, by employing a specimen of the material as the elastic member, or as a part of the elastic member, of an oscillatory structure or system of definite natural frequency and, by exciting the structure or system so as to make it oscillate in its natural frequency, subjecting the specimen in rapid succession to expansion and compression. Such proposals may be found, for example, in copending applications, Ser. No. 494,575, filed August 23, 1921, and Ser. No. 615,684, filed January 29, 1923.

The most obvious method of exciting the vibratory structure or system is to make use of electric alternating current, but it has been found from experience that it is very difficult to damp the oscillation of the vibratory structure or system strongly enough to keep the frequency of the current generating machines sufficiently constant. Small deviations in the frequency cause the weakly damped apparatus to fall out of resonance. The amplitude then alters considerably and thereby a factor of unreliability with regard to the constancy of the stressing of the specimen is introduced. With electric excitation or operation it was therefore necessary to make use of artificial damping means, thereby wasting a large part of the energy employed.

According to the present invention a unidirectional flow of fluid (liquid or gas) is used for operating such machines for testing material.

Figure 2:
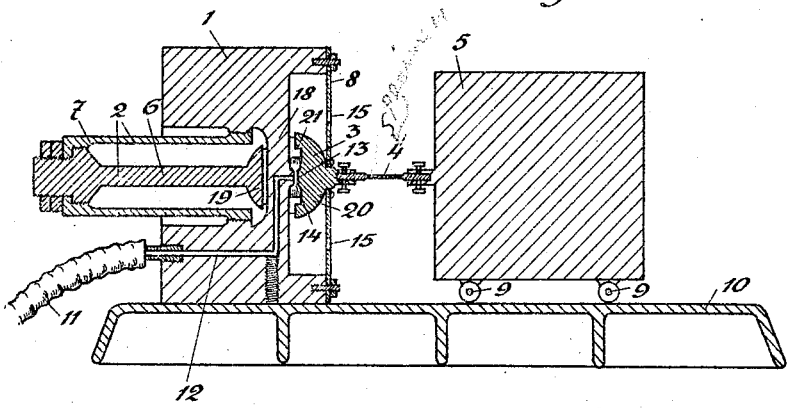
Figure 3:
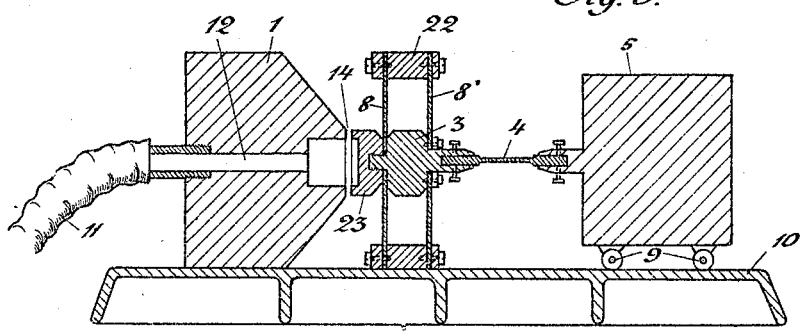

We will now describe our invention more in detail by reference to the accompanying drawings illustrating by way of example several embodiments thereof. In said drawings, Fig. 1 is a vertical section of an apparatus in which the test rod is only a part of the elastic member and the operating medium (liquid or gas) acts adjacent the periphery of the oscillatory mass;

Fig. 2 is a similar view of an apparatus in which the operating medium acts at the centre or vibratory axis of the mass; and Fig. 3 is a similar view of an apparatus in which the test rod constitutes the main elastic member of the oscillatory structure.

Figure 1:
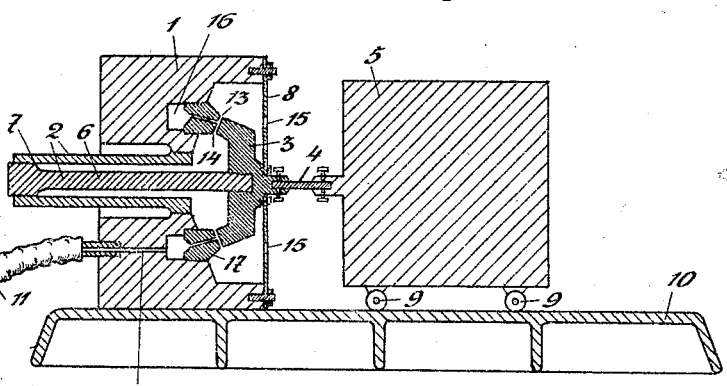

In the constructions illustrated in Figs. 1 and 2 the actual oscillatory structure comprises a relatively large mass 1, an elastic member 2, and a relatively small mass 3 to which the test piece 4 is secured. A further large mass 5 is used as an abutment for the other end of the test rod, the test rod being secured to the same. The elastic member of the vibratory structure is composed, in Figures 1 and 2, of a stem 6 and a tube 7 which are connected with one another at one end and arranged concentrically. The smaller mass 3 is also held in position by a diaphragm 8 whose elastic force however is so small that it can be neglected compared with the elastic force of the member 2. The abutment mass 5 is mounted on rollers 9 so that on the expansion of the test rod 4 due to heating it can move out longitudinally in order in this manner to avoid bending the test rod. The mass 5, however, does not respond to the vibrations of the vibratory structure. The whole system is mounted on a very rigid base 10.

Both the example of Fig. 1 and also that of Fig. 2 have an inlet pipe 11 from which through a passage 12 the operating medium is introduced to a nozzle 13 where it flows out into a gap or space 14 between the large and the small mass, and then on out through the holes 15 in diaphragm 8. The jet of fluid impinging on the mass 3 of the vibratory structure sets the latter in vibration. Since the test piece 4 is secured to the mass 3 it is subjected to the vibratory movement of the latter and is therefore alternately compressed and extended at a uniform frequency.

The action of the operating fluid in exciting the vibratory structure may be explained in a general way as follows. As the fluid is discharged from the nozzle 13 under pressure it impinges against the adjacent surface of the mass 3. The force of this causes a movement of the mass 3 away from the nozzle and against the elastic force of the elastic member of the vibratory structure. As the mass 3 moves against such elastic force the latter increases. At the same time a decrease in the pressure of the operating fluid occurs as the space between the mouth of the nozzle and the mass 3 increases and allows the more ready escape of the fluid. Thus a point is reached where the elastic force of the vibratory structure becomes sufficiently great relatively to the pressure in the fluid to cause the mass 3 to move back toward the nozzle 13. As the mass approaches the nozzle the space between it and the nozzle is reduced and hence the pressure in the fluid increases. The inertia of the mass causes it to move beyond its position of rest toward the nozzle against the elastic force of the elastic member and the fluid pressure. The increased pressure in the fluid and the elastic force of the elastic member then act to cause the mass to move in the opposite direction away from the nozzle. Thus a periodic movement of the mass toward and away from the nozzle takes place, so that the vibratory structure is set in vibration. The frequency of vibration is dependent among other things upon the individual or natural frequency of the vibratory structure, the pressure of the operating fluid, the form of discharge nozzle, and the space relation between the nozzle and the mass of the vibratory structure. The vibratory structure acts in the nature of a mechanical interrupter of the fluid flow.

The principal difference between the example of Fig. 1 and that of Fig. 2 consists in this, that in the former the excitation of the vibratory structure by the flowing out of the operating medium is effected in the vicinity of the outer edge or periphery of the weight 3 whereas in the latter case it is effected at the centre or vibratory axis of the weight 3.

In Figure 1, therefore, there is provided in the large weight 1 an annular channel 16 which communicates with the air gap 14 between the two masses 1 and 3 by means of an annular nozzle 17.

In Fig. 2, in order to facilitate an exact central excitation of the weight 3 it is provided with an opening or recess through which it is traversed by a part 18 of the large weight formed as a cross-piece. In order to facilitate the constructional assembly in this case, the weight 3 consists of two parts 19 and 20 of substantially hemi-spherical form, and the part 19 has a groove provided therein adapted to accommodate the cross-piece 18. The two parts 19 and 20 are connected together by screw-threads 21. The weight 3 is hollow and the parts are so constructed that the nozzle 13 and the air gap 14 lie in the central axis passing through the rod 6 and the test piece 4. The discharge of the operating medium takes place through the milled out portion of the weight 3 which is traversed by a cross-piece 18 and the holes 15 in the diaphragm 8.

The arrangement of Fig. 2 with the central operating medium outlet is for the purpose of avoiding transverse oscillations of the weight 3 and transverse stressing of the test piece due to any irregular flowing out of the operating medium as is possible with the annular nozzle of Fig. 1.

In the arrangement of Fig. 3 the test piece 4 forms the principal part of the elastic member of the oscillatory structure. The remainder of the elastic force is located in the holding discs 8, 8' which carry the smaller mass 3 of the oscillatory structure. The substantially larger mass of the oscillatory structure is in this case the mass 5, in contradistinction to Figs. 1 and 2, and it is mounted on rollers 9. The holding discs 8, 8' are united on the outside by a rigid ring 22 which is mounted firmly on the base 10. The large mass 1 in this case only serves to provide means for introducing the operating medium and to afford said means a fixed position with respect to the smaller oscillating mass 3. The outflow of the operating medium takes place in this case through an annular gap 14 between the large mass 1 and a plate 23 rigidly connected with and forming a part of the smaller mass 3.

The use of the test piece itself as an elastic member is made practical for the first time by the use of the unidirectional flow of fluid as the exciting force, because in this case the alternating current energy necessary with electric-magnetic drive, to which the oscillatory system of the testing machine had to be exactly tuned, is dispensed with. Any variation of the elastic properties of the test piece which causes the natural frequency of the oscillatory structure to vary makes no difference to the action of the present apparatus because the system regulates itself and no second alternating current force is present with which resonance has to be provided.

The reason why in these constructions the large mass 5 has to be mounted so as to be capable of movement is because the length of the test piece alters during the experiment owing to heating, and also because the whole oscillatory system 3, 4, 5 tends to shift somewhat in a longitudinal direction owing to the static pressure of the operating medium. If the mass 5 were fixed jamming of the test pieces 4 would occur, which in all circumstances is to be avoided.

An advantage which is attained by this manner of operation is that the complications of the electric arrangement (alternating current machines, with high frequencies, also special transformer) are avoided.

Also the design of the apparatus itself is simpler and from the point of view of the vibratory apparatus freer from objection, because the masses do not any longer have to be constructed as magnetic systems with exciting coils.

A further advantage is that with this manner of operation a small damping of the apparatus can be provided for without any drawbacks because no energy fluctuating in frequency has to be considered. This is particularly advantageous because apparatus of this kind has all the higher efficiency the smaller its natural damping is.

What we claim is:

1. The method of actuating a device for testing materials by alternating stresses produced by oscillations of a vibratory structure acting upon a test piece of the material, which comprises causing a unidirectional stream of fluid to impinge against a portion of the vibratory structure in such manner that the latter is set in vibration.

2. The method of actuating a device for testing materials by alternating stresses produced by oscillations of a vibratory structure acting upon a test piece of the material, which comprises causing a unidirectional stream of fluid to impinge against a portion of the vibratory structure in such manner that the latter is set in vibration, and that the vibratory structure acts as a mechanical interrupter of the fluid stream and is thereby maintained in vibration.

3. In apparatus for testing materials, a vibratory structure having a definite natural frequency and composed of distinct masses connected by an elastic member, a test piece forming at least a part of the said elastic member, and means for causing a unidirectional stream of fluid to impinge against one of the masses of said vibratory structure to set it in vibration, the space between the fluid outlet and the mass being adapted to be varied by the vibrations of the mass.

4. In apparatus for testing materials, a vibratory structure having a definite natural frequency and composed of two distinct masses connected by an elastic member, one mass being smaller than the other, a test piece forming at least a part of the said elastic member, and means for causing a unidirectional stream of fluid to impinge against the smaller mass of said vibratory structure to set it in vibration, the space between the fluid outlet and the mass being adapted to be varied by the vibrations of the mass.

5. In apparatus for testing materials, a vibratory structure having a definite natural frequency and composed of distinct masses connected by an elastic member comprising a test piece of the material so as to subject the latter to the vibrations of at least one of the said masses, means for causing a unidirectional stream of fluid to impinge against the said mass to set it in vibration, the space between the fluid outlet and the mass being adapted to be varied by the vibrations of the mass.

6. In apparatus for testing materials, a vibratory structure having a definite natural frequency and composed of two distinct masses connected by an elastic member comprising a test piece of the material so as to subject it to the vibrations of at least one of said masses, one mass being smaller than the other, the larger mass being mounted upon rollers and resting on a support, the smaller mass facing a member mounted on said supporting carrying a nozzle for casting a unidirectional stream of fluid against the smaller mass to set it in vibration, and elastic discs for positioning said smaller mass, the space between the fluid outlet and the smaller mass being adapted to be varied by the vibrations of the smaller mass.

7. In apparatus for testing materials, a relatively large mass, a relatively small mass, means for securing a test piece of the material to said masses to form a vibratory structure, and means for causing a unidirectional stream of fluid to impinge against one of the masses of said vibratory structure to set it in vibration and thus subject said test piece to alternating stresses.

8. In apparatus for testing materials, a supporting base, a relatively large mass mounted on rollers resting on said base, a relatively small mass, means for elastically supporting said small mass in position, means for securing a test piece of the material between the masses to form a vibratory structure, and means for causing a unidirectional stream of fluid to impinge against one of the masses of said vibratory structure to set it in vibration and thus subject said test piece to alternating stresses.

In testimony whereof we affix our signatures in presence of two witnesses.

HEINRICH HECHT.
WILHELM RUDOLPH.

Witnesses:
 ACUCAR MARKER,
 EMIL LÜTT.